(12) United States Patent
Lashley

(10) Patent No.: US 6,314,185 B1
(45) Date of Patent: *Nov. 6, 2001

(54) SANITARY COVER FOR A TELEPHONE HANDSET

(76) Inventor: Marcus Gilford Lashley, 204 W. 134th St., New York, NY (US) 10030

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/025,518

(22) Filed: Feb. 18, 1998

(51) Int. Cl.$^7$ ...................................................... H04M 1/00
(52) U.S. Cl. ............................................. 379/452; 379/439
(58) Field of Search .................................... 379/452, 439, 379/451, 437, 447

(56) References Cited

U.S. PATENT DOCUMENTS

| | | | | |
|---|---|---|---|---|
| 644,680 | * | 3/1900 | Ordway | 379/452 |
| 961,369 | * | 6/1910 | Peck | 379/452 |
| 3,238,313 | * | 3/1966 | Kalogris | 379/452 |
| 4,546,217 | | 10/1985 | Frehn . | |
| 4,964,161 | | 10/1990 | Trowbridge, Jr. . | |
| 5,054,063 | | 10/1991 | Lo et al. . | |
| 5,396,557 | | 3/1995 | Tonci . | |

FOREIGN PATENT DOCUMENTS

2674713 * 10/1992 (FR) ...................................... 379/452

* cited by examiner

*Primary Examiner*—Jack Chiang
(74) *Attorney, Agent, or Firm*—Jack J. Schwartz

(57) ABSTRACT

A sanitary cover for connection to the microphone or speaker portions of a telephone handset and preventing transmission of microscopic particles present on the handset therethrough. The sanitary cover includes a central section and a peripheral section integral with and extending around the central section. The central section is positioned to cover a face side of either the microphone or speaker portion of the handset whereby the peripheral section extends along a side of the microphone or speaker portion, removably securing the sanitary cover thereto. Both the central and peripheral sections are made of a flexible material. The cover may further be provided with a connection device for further securing the sanitary cover to the microphone or speaker portion and preventing accidental removal of the sanitary cover therefrom. Furthermore, the central section may be provided with at least one perforation extending therethrough for reducing any distortion to sound waves passing therethrough.

1 Claim, 3 Drawing Sheets

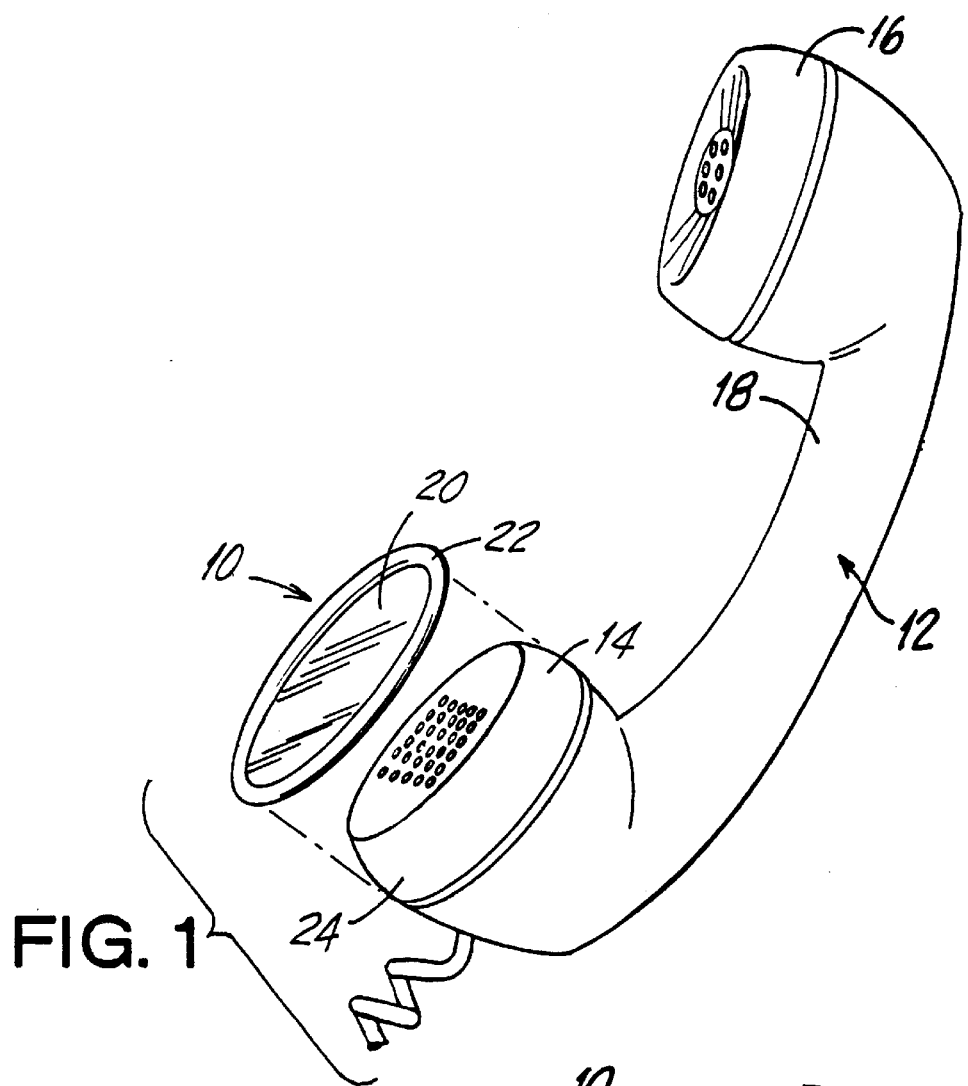
FIG. 1
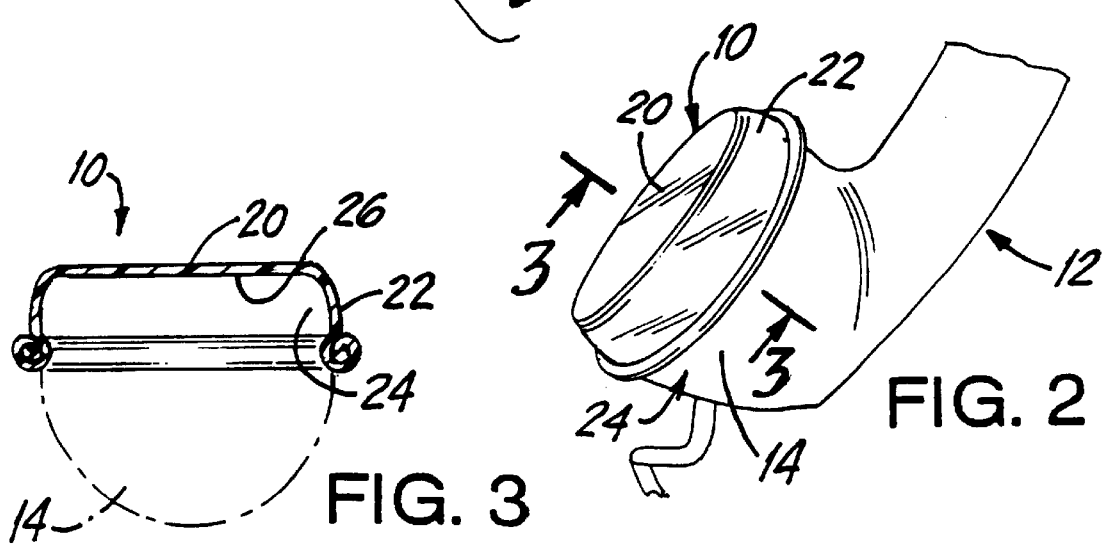
FIG. 3
FIG. 2

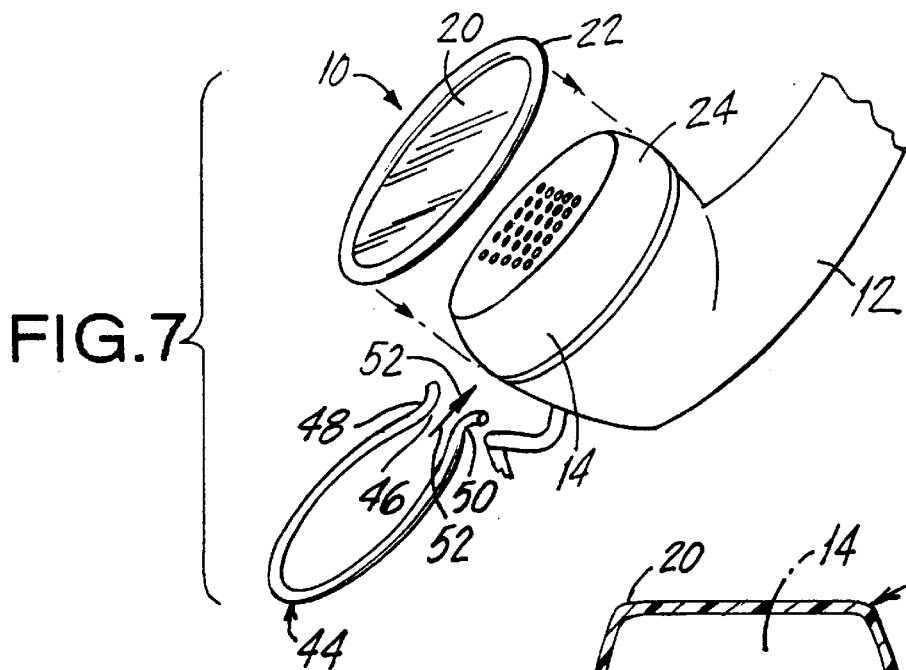
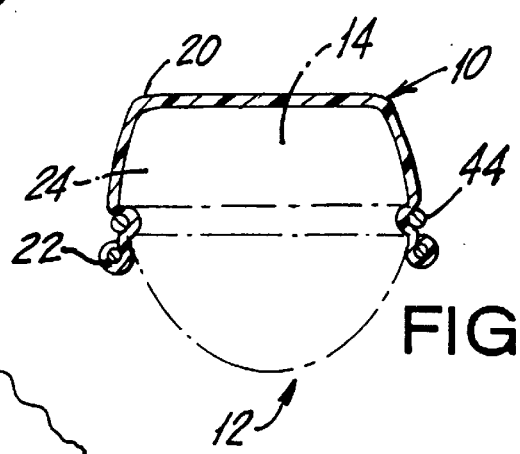
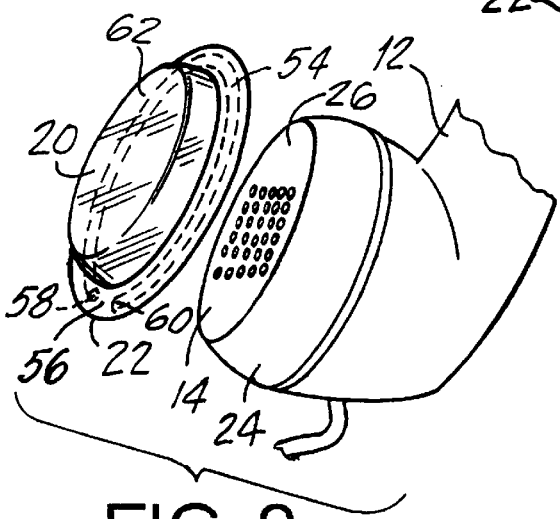
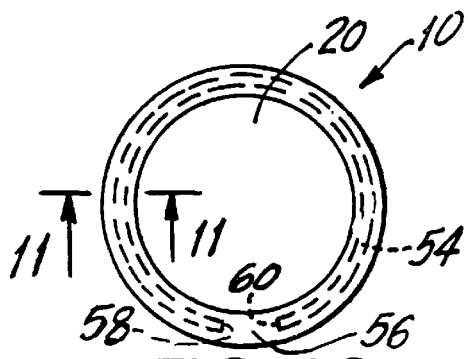
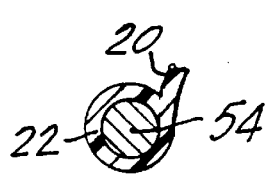

SANITARY COVER FOR A TELEPHONE HANDSET

BACKGROUND OF THE INVENTION

1. Field of the Invention

The present invention relates generally to sanitary covers for telephone handsets and, more specifically, to an easily transportable and nonburdensome device removably connected to a telephone handset for preventing the transfer of germs and the like through contact with at least one of the microphone and speaker sections of the telephone handset.

2. Description of the Prior Art

Numerous sanitary covers for telephone handsets have been provided in the prior art. Such covers are used to cover at least one of the microphone and speaker of the telephone handset to prevent the transmission of germs, bacteria and the like from one user to a subsequent user of the telephone. For example, U.S. Pat. Nos. 4,546,217; 4,964,161; 5,054,063 and 5,396,557 all are illustrative of such prior art. While these units may be suitable for the particular purpose to which they address, they would not be as suitable for the purposes of the present invention as heretofore described.

U.S. Pat. No. 4,546,217

Inventor: John L. Frehn

Issued: Oct. 8, 1985

An inexpensive, disposable sanitary cover for telephones, comprising a sleeve-like member adapted to receive and retain therein a telephone handset, and wherein a cord-encasing member is also provided to encase a telephone cord. A generally conformable base-encasing member adapted to encase and seal a telephone base member from direct contact with a telephone user is also provided for.

U.S. Pat. No. 4,964,161

Inventor: Allen R. Trowbridge, Jr.

Issued: Oct. 16, 1990

A cover for a telephone handset includes a monolithic, one-piece body that has speaker-covering and ear piece-covering holes defined therein, and a speaker filter element and an ear piece filter element removably mounted on the body in covering relationship with each of the holes. The filter elements are removed and replaced after each use of the cover so that germs on one handset will not be transmitted to the speaker or ear piece of another handset by the cover.

U.S. Pat. No. 5,054,063

Inventor: Josephine N. Lo et al.

Issued: Oct. 1, 1991

A sound-permeable disposable sanitary telephone cover attachable to the sound transmitting portions of a telephone for protecting a user from contacting the sound transmitting portions of the telephone and being exposed to bacteria and other contagious and infectious agents carried by the telephone. The telephone cover comprises a disposable sheet sized to cover the sound transmitting members of a telephone, the sheet including a number of layers of material bonded together. One or more layers comprising the sheet may be water impermeable and may include a disinfectant to deter the transfer therethrough of bacteria and other germs. The cover is attached to a telephone through the use of an adhesive.

U.S. Pat. No. 5,396,557

Inventor: Matulina Tonci

Issued: Mar. 7, 1995

A disposable sanitary pad and associated dispenser for covering portions of a telephone handset to protect a user from contact with those portions. The pads are contained within a dispenser assembly and are attachable to both the mouthpiece and the ear piece of the telephone handset by hook and pile fasteners. The dispenser allows a simultaneous placement of a pair of pads to the handset from an underlying supply of the same and includes a desiccant assembly for maintaining the pads in a dry condition.

SUMMARY OF THE PRESENT INVENTION

The present invention relates generally to sanitary covers for telephone handsets and, more specifically, to an easily transportable and nonburdensome device removably connected to a telephone handset for preventing the transfer of germs and the like through contact with at least one of the microphone and speaker sections of the telephone handset.

A primary object of the present invention is to provide a sanitary cover for telephone handsets that will overcome the shortcomings of prior art devices.

Another object of the present invention is to provide a sanitary cover for telephone handsets which is able to prevent the transfer of germs and dirt from one user of a telephone to subsequent users.

An additional object of the present invention is to provide a sanitary cover for telephone handsets which is able to adapt for attachment to any size telephone handset.

A further object of the present invention is to provide a sanitary cover for handsets which is made of a flexible elastic material which conforms to the shape of the microphone or speaker portion of the telephone handset when placed thereon and may be easily removed therefrom for future use on another telephone handset.

A yet further object of the present invention is to provide a sanitary cover for telephone handsets including a connector device for removably securing the sanitary cover to the microphone or speaker section of the telephone handset and preventing inadvertent removal of the sanitary cover therefrom.

A still further object of the present invention is to provide a sanitary cover for telephone handsets including a connector device imbedded within the periphery of the sanitary cover for aiding in the securement of the sanitary cover to the telephone handset.

An even further object of the present invention is to provide a sanitary cover for telephone handsets which may be covered with a disinfectant prior to and after use for increasing the resistance of the sanitary cover to the transmission of germs.

A yet further object of the present invention is to provide a sanitary cover for telephone handsets including a pattern of perforations extending through a central portion thereof for increasing the ability of the sanitary cover to transmit sound waves therethrough.

Another object of the present invention is to provide a sanitary cover for telephone handsets that is simple and easy to use.

A still further object of the present invention is to provide a sanitary cover for telephone handsets that is economical in cost to manufacture.

Additional objects of the present invention will appear as the description proceeds.

A sanitary cover for connection to the microphone or speaker portions of a telephone handset and preventing transmission of microscopic particles present on the handset therethrough. The sanitary cover includes a central section and a peripheral section integral with and extending around the central section. The central section is positioned to cover a face side of either the microphone or speaker portion of the handset whereby the peripheral section extends along a side of the microphone or speaker portion, removably securing the sanitary cover thereto. Both the central and peripheral sections are made of a flexible material. The cover may further be provided with a connection device for further securing the sanitary cover to the microphone or speaker portion and preventing accidental and inadvertent removal of the sanitary cover therefrom. Furthermore, the central section may be provided with at least one perforation extending therethrough for reducing distortion caused to sound waves emanating from the speaker or spoken into the microphone.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

FIG. 1 is a front elevational perspective view of the sanitary cover of the present invention and a telephone handset to which it is removably secured;

FIG. 2 is a side perspective view of the sanitary cover of the present invention removably connected to a telephone handset;

FIG. 3 is a side cross-sectional view of the sanitary cover of the present invention taken in the direction of the arrows labeled 3—3 in FIG. 2;

FIG. 7 is an exploded side perspective view the sanitary cover of the present invention including a second connection device for removably securing the sanitary cover to a telephone handset and a telephone handset to which it is to be removably secured;

FIG. 8 is a side cross-sectional view of the sanitary cover of the present invention including the second connection device shown in FIG. 7;

FIG. 9 is an exploded side perspective view the sanitary cover of the present invention including a third connection device imbedded therein for removably securing the sanitary cover to a telephone handset and a telephone handset to which it is to be removably secured;

FIG. 10 is a top perspective view of the sanitary cover of the present invention including the third connection device as shown in FIG. 9; and FIG. 11 is a side cross-sectional view of a portion the sanitary cover of the present invention including the third connection device taken in the direction of the arrows labeled 11—11 in FIG. 10.

DESCRIPTION OF THE REFERENCED NUMERALS

Figure 4:
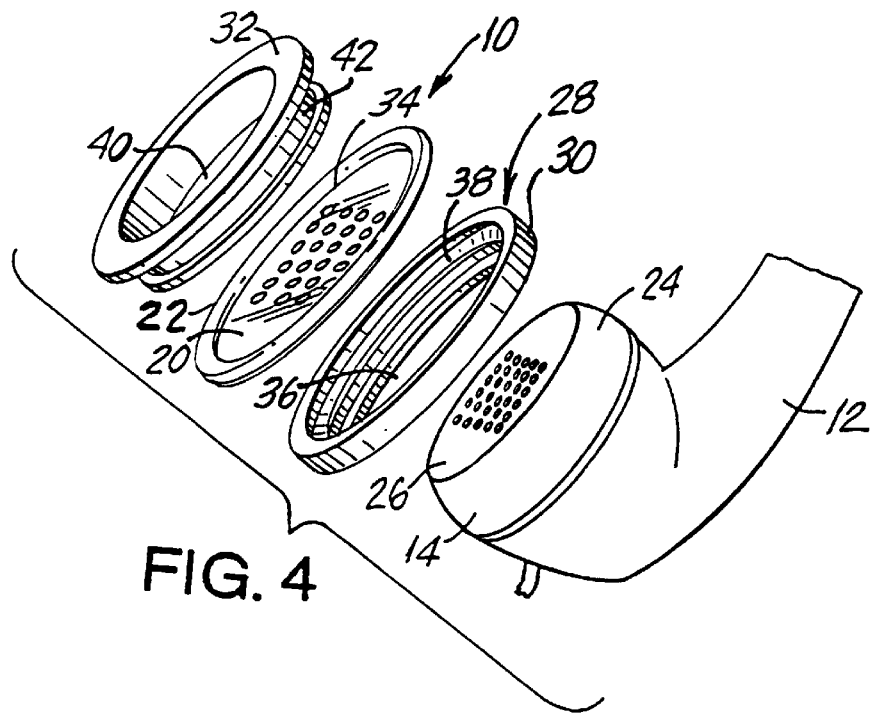
FIG. 4 is an exploded side perspective view the sanitary cover of the present invention including a first connection device for removably securing the sanitary cover to a telephone handset and a telephone handset to which it is to be removably secured.

Turning now descriptively to the drawings, in which similar reference characters denote similar elements throughout the several views, the Figures illustrate the sanitary cover for a telephone handset of the present invention. With regard to the reference numerals used, the following numbering is used throughout the various drawing figures.

10 sanitary cover for a telephone handset of the present invention
    12 telephone handset
    14 microphone section of the telephone handset
    16 speaker section of the telephone handset
    18 midsection of the telephone handset
    20 midsection of sanitary cover
    22 peripheral section of the sanitary cover
    24 side of microphone section of telephone handset
    26 face portion of the microphone section
    28 first connection device
    30 base of first connection device
    32 cap of first connection device
    34 perforations in sanitary cover
    36 recess in base
    38 protrusion extending around recess in base
    40 recess in cap
    42 groove extending around recess in cap
    44 second connection device
    46 opening in second connection device
    48 first end of second connection device
    50 second end of first connection device
    52 arrow indicating direction of force applied to second connection device for securing to telephone handset
    54 third connection device
    56 recess
    58 first end of third connection device
    60 second end of third connection device
    62 excess material in central section of sanitary cover

DETAILED DESCRIPTION OF THE PREFERRED EMBODIMENT

Turning now descriptively to the drawings, in which similar reference characters denote similar elements throughout the several views, the sanitary cover for a telephone handset of the present invention is illustrated in FIGS. 1–11 and indicated generally by the numeral 10.

The sanitary cover for telephone handsets 10 is illustrated in FIG. 1 with a telephone handset 12 to which it is removably secured. The telephone handset 12 includes a speaker section 14, a microphone section 16 and a midsection 18 positioned therebetween for connecting the microphone section 14 to the speaker section 16 as in any conventional telephone. In this and subsequent figures the sanitary cover for telephone handsets 10 is shown being secured to the microphone section 14 of the telephone handset 12. However, the sanitary cover for telephone handsets 10 may also be secured to the speaker section 16 of the telephone handset 12 for use in the same manner as with the microphone section 14. The preferred use of the sanitary handset of the present invention is for preventing the transmission of dirt, bacteria and germs from a telephone handset. However, the sanitary handset may be removably connected to any object having a similar size and dimensions to prevent the transmission of dirt, germs and bacteria therefrom. Alternatively, the sanitary cover may be formed of a similar size and dimension of any object of which connection thereto is desired.

The sanitary cover for telephone handsets 10 is shaped to substantially match at least one of the shape of the microphone and speaker sections 14 and 16 of the telephone handset 12 and includes a central section 20 and a peripheral section 22 surrounding and integral with the central section 20. The peripheral section 22 is rolled to form a rim about the periphery of the central section 20. Upon placement of the central section 20 over either the microphone or speaker section 14 or 16 of the telephone handset 12, the peripheral section 22 is unrolled to cover the side 24 of the microphone or speaker section 14 or 16 removably securing the sanitary cover 10 thereto.

The sanitary cover for telephone handsets 10 is formed of a piece of flexible, elastic material and of a size slightly smaller than the microphone or speaker section 14 or 16 it is to cover. The sanitary cover 10 is made of any elastomeric material such as latex, rubber, polymeric materials or any combination thereof whereby the material is able to be stretched to fit about the microphone or speaker sections 14 or 16 of a telephone handset 12 and includes memory so as to be able to retain its original shape when removed therefrom. The sanitary cover 10 of the present invention is illustrated in the figures as having a circular shape. However, the shape of the sanitary cover 10 may be circular, square, rectangular or any other shape to match that of the microphone or speaker sections of a telephone handset. Furthermore, due to the elasticity of the material and the size of the sanitary cover 10 the peripheral section 22 will act to secure a sanitary cover 10 of any shape formed in accordance with the present invention to a microphone or speaker section 14 or 16 having a comparable surface area regardless of shape when it is rolled thereover.

FIGS. 2 and 3 illustrate the sanitary cover 10 in position covering a circular microphone section 14 of a telephone handset 12. As can be seen from these figures the central section 20 is positioned to cover the microphone section 14 of the telephone handset 12 and is stretched thereover to prevent or minimize vibration of the central section 20 of the sanitary cover 10 which would distort any sound waves passing therethrough. The peripheral section 22 is rolled down over the side 24 of the microphone section 14 and acts to grasp the side 24 holding the sanitary cover 10 thereto.

As can be seen in the cross-sectional view of FIG. 3, the central section 20 of the sanitary cover 10 is stretched to form a substantially sealed relationship with a face portion 26 of the microphone section 14. In this position atop the microphone section 14, any germs, bacteria, dirt or the like is prevented from passing through the sanitary cover 10 to infect a subsequent user of the telephone. Additionally, the sanitary cover 10 may be sprayed with a disinfectant or a disinfectant may be manually applied prior to and after use to provide further protection from germs, bacteria, dirt and the like present on the telephone handset prior to use.

Figure 5:
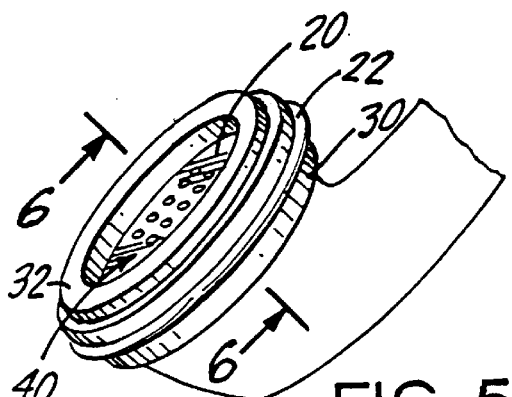
FIG. 5 is a side perspective view of the sanitary cover of the present invention including the first connection device as shown in FIG. 4 attached to a telephone handset.
Figure 6:
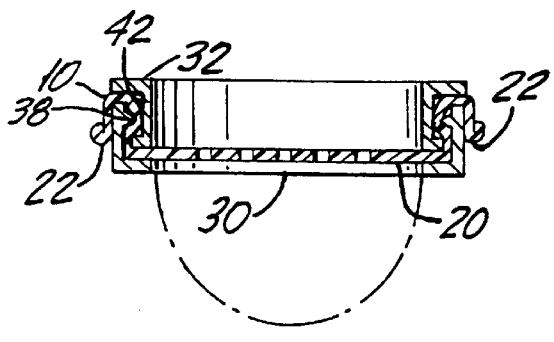
FIG. 6 is a side cross-sectional view of the sanitary cover of the present invention including the first connection device taken in the direction of the arrows labeled 6—6 in FIG. 5.

FIGS. 4–6 illustrate the sanitary cover 10 along with a first connection device 28 for use in aiding the securement of the sanitary cover 10 to the microphone section 14 or speaker section 16 of a telephone handset 12. The first connection device 28 includes a base 30 and a cap 32. FIG. 4 illustrates an exploded view of the sanitary cover 10 and connection device 28 for placement on the microphone section 14 of a telephone handset 12. The sanitary cover 10 illustrated in this figure includes a pattern of perforations 34 extending therethrough. The perforations 34 extending through the central section 20 provide a passageway for sound waves to emanate therethrough and further prevent distortion of the sound. The perforations 34 may be of any size sufficient to allow the unimpeded passage of sound waves while preventing the passage of germs, bacteria, dirt and the like from passing therethrough. Furthermore, the number of perforations and the pattern formed thereby in the central portion of the sanitary cover 10 is designed to provide the user with the clearest reception and transmission of sound therethrough. The pattern of the perforations 34 shown in FIG. 4 is for purposes of example only and not meant to be limiting on the number of perforations 34 and the pattern formed by their position extending through the central portion 20 of the sanitary cover 10. The first connection device 28 may be made of any substantially rigid material able to perform the functions of being removably secured to a microphone or speaker section 14 or 16 of a telephone handset 12 and to form a base and cap section able to retain the sanitary cover 10 therebetween. Preferably, the first connection device 28 will be made of plastic or any other polymeric material. However, the first connection device 28 may also be formed of any metal, combination of metals or alloys thereof.

The base 30 is shaped to fit about the side 24 of the microphone section 14 and includes a recess 36 extending through a midsection thereof. Extending around at least a portion of an outer side of the base 30 on a side opposite the recess 36 is a protrusion 38 for mating with the cap 32. The cap 32 also includes a recess 40 extending therethrough and a groove 42 extending around an inner side of the cap 32 within the recess 40 for receiving the protrusion 38 extending around the recess 36 of the base 30. Alternatively, the base 30 may be formed with a groove extending around the recess 36 and the cap 32 may include a protrusion extending around at least a portion an outer side thereof opposite the recess 40 for mating with the groove in the base 30. The groove and protrusion combination may be present in any desired combination as long as the groove is able to receive the protrusion therein.

The sanitary cover 10 and connection device 28 are illustrated in a position secured to the microphone section 14 in FIGS. 5 and 6. As can be seen from these figures, the base 30 is positioned around the side 24 of the microphone section 14 with the microphone section 14 extending at least partially into the recess 36. The sanitary cover 10 is positioned atop the base 30 so as to cover the face 26 of the microphone section 14 and the cap 32 is positioned atop the sanitary cover 10. When the cap 32 is placed atop the sanitary cover 10 and a force is applied thereto in a direction towards the base 30, the protrusion 38 extending around the cap 32 is caused to be received by the groove 42 thus removably sealing the sanitary cover 10 between the base 30 and cap 32. In this position, the first connection device 28 will retain the sanitary cover 10 atop the face 26 of the microphone section 14.

A second connection device 44 for use in securing the sanitary cover 10 to the telephone microphone 14 is illustrated in FIGS. 7 and 8. The second connection device 44 is substantially C-shaped or horseshoe shaped whereby an inner side of the second connection device substantially matches the shape of the side 24 of the microphone section 14. The second connection device 44 includes an opening 46 at one end thereof defined by first and second ends 48 and 50 of the second connection device 44 so that the second connection device 44 may be clamped to the microphone section 14. The second connection device 44 is made of a substantially rigid material having a degree of flexibility and memory so as to be able to expand the size of the opening 46 to a size at least equal to a diameter of the microphone section 14 about which it is to be clamped to, contract back to a size and shape able to be retained about the microphone section 14 and return to its original shape when removed from its position clamping the sanitary cover 10 to the microphone section 14. In use, the sanitary cover 10 is placed over the microphone section 14 in the manner described above with reference to FIGS. 1–3 and a force is exerted on the connection device 44 in the direction of the arrow 52 of FIG. 7. When the first and second ends 48 and 50 of the opening 46 contact the side 24 of the microphone section 14, the force applied in the direction of the arrow 52 causes the first and second ends 48 and 50 to be spread further apart thereby expanding the opening 46. As the opening 46 is expanded, the second connection device 44 is able to fit further around the side 24 of the microphone section 14 and the sanitary cover 10 positioned thereon. The flexible nature of the second connection device 44 acts to secure the sanitary cover 10 to the microphone section 14 once the second connection device 44 is positioned so as to surround both the sanitary cover 10 and the side 24 of the microphone section 14.

An embodiment of the sanitary cover 10 including a third connection device 54 imbedded within the peripheral section 22 thereof is illustrated in FIGS. 9–11. The third connection device 54 forms a ring with a cut therein to form a gap 56 defined by first and second ends 58 and 60. The connection device 54 is formed of a substantially rigid material having a degree of flexibility whereby the gap 56 is able to upon application of a force thereto such as when the connection device 54 is placed over the microphone section 14 of a telephone handset 12. The central section 20 of the sanitary cover 10 includes excess material 62 whereby the central section 20 is able to cover both the top 28 and at least a portion of the side 24 of the microphone section 14 when the sanitary cover 10 is positioned over the microphone section 14 of the telephone handset 12. The sanitary cover 10 is then stretched down over the microphone section 14 by applying a force to the peripheral section 22 until the slack is removed from the excess material 62. When this force is applied, the size of the gap 56 and thus the circumference of the third connection device 54 is caused to expand to fit about the side of the microphone section 14. In this position the sanitary cover 10 forms a tight seal over the microphone portion 14 and is held in place by the third connection device 54.

The operation of the sanitary cover 10 for a telephone handset 12 will now be described with reference to the Figures. Prior to first use, the sanitary cover 10 is contained within a sealed package in which it is protected in a sanitary manner and immune to the effects of the outside atmosphere. In operation, the sanitary cover 10 is removed from its sealed package and is ready for use. At this time the user may spray the sanitary cover with a disinfectant spray or manually apply a disinfectant as desired for added protection from germs, bacteria and dirt. However, the sanitary cover 10 will preferably be packaged with a disinfectant previously applied and thus additional disinfectant is not needed for initial use. The sanitary cover 10 is now ready for use.

If the user desires to use the sanitary cover 10 without the assistance of a connection device, the user holds the sanitary cover 10 at the peripheral section 22. The user then picks up the telephone handset 12 and decides whether it is desired to cover the microphone section 14 or speaker section 16 of the headset 12. The remainder of the description will discuss applying the sanitary cover 10 for use in covering the microphone section 14 of the telephone handset 12. However, it is to be realized that the speaker section 16 of the telephone handset 12 may also be covered with the sanitary cover 10 of the present invention in an identical manner. A force is then applied by the user to the peripheral section 22 in a direction towards the microphone section 14 such that the central section 20 is caused to contact the face side 26 of the microphone section 14 and the peripheral section 22 contacts the side 24 of the microphone section 14. The force is continually applied causing the central section 20 to stretch across the face side 26 and the peripheral section 22 to unroll along the side 24 until the peripheral section 22 is unrolled to a distance along the side 24 able to adequately hold the sanitary cover 10 in place on the microphone section 14 and the central section 20 is stretched to an extent sufficient to prevent or minimize vibrations therein when sound waves attempt to pass therethrough.

At this point the user must decide if it is desirable to use the second connection device 44 described above and illustrated in FIGS. 7 and 8 for added security in securing the sanitary cover 10 to the microphone section 14. If such is desired, the second connection device 44 is grasped by the user with the opening 46 placed in contact with the sanitary cover 10 covering the side 24 of the microphone section 14. A force is then applied in a direction indicated by the arrow 52 towards the side 24 causing a pressure to be applied on the first and second ends 48 and 50 of the connection device 44. This force against the side 24 of the microphone section 14 causes the ends 48 and 50 to move further apart and the opening 46 to expand. The pressure is applied until the opening 46 is equal to the diameter of the microphone section 14 allowing the second connection device 44 to fit around the side 24. As the connection device 44 is moved along the circumference of the side 24 the size of the opening 46 is caused to expand until it equals the diameter of the microphone section 14. At this point the connection device 44 surrounds half of the microphone section 14. As additional pressure is applied the size of the opening 46 is caused to decrease as it passes along the circumference of the side 24 of the microphone 14 until a side of the connection device 44 opposite the opening 46 contacts the sanitary cover 10 and the side 24 of the microphone section 14. In this position, the connection device 44 secures the sanitary cover 10 to the microphone section 14 preventing the sanitary cover 10 from being accidentally removed from its position covering the microphone section 14 and any germs, bacteria, dirt or the like from affecting the user of the telephone handset 12.

If the third connection device 54 is imbedded in the peripheral section 22 as illustrated in FIGS. 9–11 the sanitary cover 10 is grasped by the user about the peripheral section 22 and a force is applied towards the microphone section 14. As the peripheral section 22 is forced down further along the side 24 of the microphone section 14, the gap 56 in the third connection device 54 is caused to expand. This causes the circumference of the third connection device 54 to expand until it substantially equals the circumference of the side 24 of the microphone section 14 at a point at which it will sit when secured thereto. The force is applied until the peripheral section 14 is secured about the side 24 and the central section 20 covers the microphone section 14 removing any slack caused by the excess material 62.

If the first connection device illustrated in FIGS. 4–6 is used, prior to placing the sanitary cover 10 over the microphone section 14, the base 30 is securely positioned around the side 24 of the microphone section 14. The sanitary cover 10 is then positioned as explained above over the microphone section 14 whereby the peripheral section 22 is unrolled over the base 30. In this position, the sanitary cover 10 also covers the base 30. A force is then applied to the cap 32 towards the sanitary cover 10 until the groove 42 extending therearound receives the protrusion 38 extending at least partially around an opposite side of the base 30 causing the cap 32 and base 30 to releasably mate with each other. The sanitary cover 10 is secured between the cap 32 and base 30 and thus also to the microphone section 14. The telephone handset 12 can now be used without fear of infection from any germs, bacteria, dirt or the like present on the telephone handset 12.

Once use of the telephone is completed, the sanitary cover 10 may be removed by applying a force in a direction opposite to the force used to secure the sanitary device 10 to the microphone section 14. If the first connection device 28 was used, a force is first applied to the cap 32 in a direction opposite to the force used to engage the cap 32 with the base 30 until the cap 32 is disengaged and removed therefrom. The sanitary cover 10 is then removed as described above.

If the second connection device 44 was used to aid in securing the sanitary cover to the microphone section 14, the second connection device 44 is grasped by the user. A force is then applied to the second connection device 44 in a direction opposite to that used to secure the second connection device 44 about the side 24 of the microphone section 14. Once the second connection device 44 is removed, the peripheral section 22 is then rolled up to its original state and the sanitary cover 10 is removed from the microphone section 14 as explained above.

After the sanitary cover 10 is used it may be washed and a disinfectant may be sprayed on or manually applied so that it may be reused the next time it is desired to place a telephone call. The sanitary cover 10 is then reused in the same manner as the prior usage.

The present invention has been described for use in covering the microphone or speaker section of a telephone handset. However, the present invention is not limited to use solely for covering a microphone or speaker section of a telephone handset but can be used to cover any object and protect the user from the transmission of germs, bacteria, dirt or the like present thereon. The use of a telephone handset is for purposes of description only and not meant to limit the scope of the present invention.

From the above description it can be seen that the sanitary cover for a telephone handset of the present invention is able to overcome the shortcomings of prior art devices by providing a sanitary cover for a telephone handset which is able to prevent the transfer of germs and dirt from one user of a telephone to subsequent users and is adaptable for attachment to either the microphone or speaker of any telephone handset. The sanitary cover for telephone handsets is able to be easily attached and removed from a telephone handset and includes a connector device for removably securing the cover to the microphone or speaker sections of the telephone handset and preventing inadvertent removal of the cover from the handset. The connector device of the sanitary cover for telephone handsets may be external to or imbedded within the periphery of the sanitary cover for securing the cover to the telephone handset. Furthermore, the sanitary cover for a telephone handset of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters patent is set forth in the appended claims:

1. A sanitary cover removably attached to one of a microphone and speaker section of a telephone for preventing transmission of microscopic particles present on the telephone section therethrough, said sanitary cover comprising:

a) a central section having at least one perforation extending therethrough for the transmission of sound waves and a peripheral section integral with and extending around a periphery of said central section, said central section being positioned to cover a face side of said telephone section;

c) a connection device for removably securing said central section to said telephone section; and d) said connection device comprising a base and a cap, said base releasably engaging said telephone section, said central section nesting inside of said base, and said cap fitted into and removably connected to said base for retaining said central section therebetween, said base including a protrusion extending inwardly and said cap including a groove for releasably receiving said protrusion therein, said peripheral section of said sanitary cover passing through said groove overlapping said protrusion, extending over a free end of said base, and a free edge of said peripheral section draped over the outside of said base.

* * * * *